(12) United States Patent
Lee et al.

(10) Patent No.: US 8,533,591 B2
(45) Date of Patent: Sep. 10, 2013

(54) MOBILE TERMINAL AND METHOD OF CONTROLLING MOBILE TERMINAL

(75) Inventors: Joo Woo Lee, Seoul (KR); Kyung Hye Seo, Seoul (KR); Ho Young Hwang, Gyeonggi-do (KR); Sun Jung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 13/006,373

(22) Filed: Jan. 13, 2011

(65) Prior Publication Data

US 2011/0302488 A1     Dec. 8, 2011

(30) Foreign Application Priority Data

Jun. 8, 2010 (KR) .................... 10-2010-0053780

(51) Int. Cl.
*G06F 17/00* (2006.01)

(52) U.S. Cl.
USPC ........... 715/243; 715/253; 715/273; 715/802; 715/204

(58) Field of Classification Search
USPC .................. 715/204, 243, 253, 273, 802
See application file for complete search history.

(56) References Cited

U.S. PATENT DOCUMENTS

| | | | |
|---|---|---|---|
| 6,624,846 B1 * | 9/2003 | Lassiter | 348/211.4 |
| 7,058,940 B2 * | 6/2006 | Calahan | 717/167 |
| 2004/0008635 A1 * | 1/2004 | Nelson et al. | 370/260 |
| 2005/0033657 A1 * | 2/2005 | Herrington et al. | 705/26 |
| 2005/0071864 A1 * | 3/2005 | Denoue et al. | 725/9 |

FOREIGN PATENT DOCUMENTS

| EP | 1947561 | 7/2008 |
|---|---|---|

* cited by examiner

*Primary Examiner* — Stephen S. Hong
*Assistant Examiner* — Matthew Ludwig
(74) *Attorney, Agent, or Firm* — Lee, Hong, Degerman, Kang & Waimey

(57) ABSTRACT

A mobile terminal is provided that includes: a display unit configured to display a webpage having a plurality of sections; a wireless communication unit configured to provide Internet access; a memory unit configured to store history information regarding usage of the webpage; and a control unit configured to control a display of a preferred section of the plurality of sections of the webpage upon an access of the webpage such that the preferred section is visually distinguishable from other sections of the plurality of sections, wherein display of the preferred section is based on the stored history information.

15 Claims, 23 Drawing Sheets

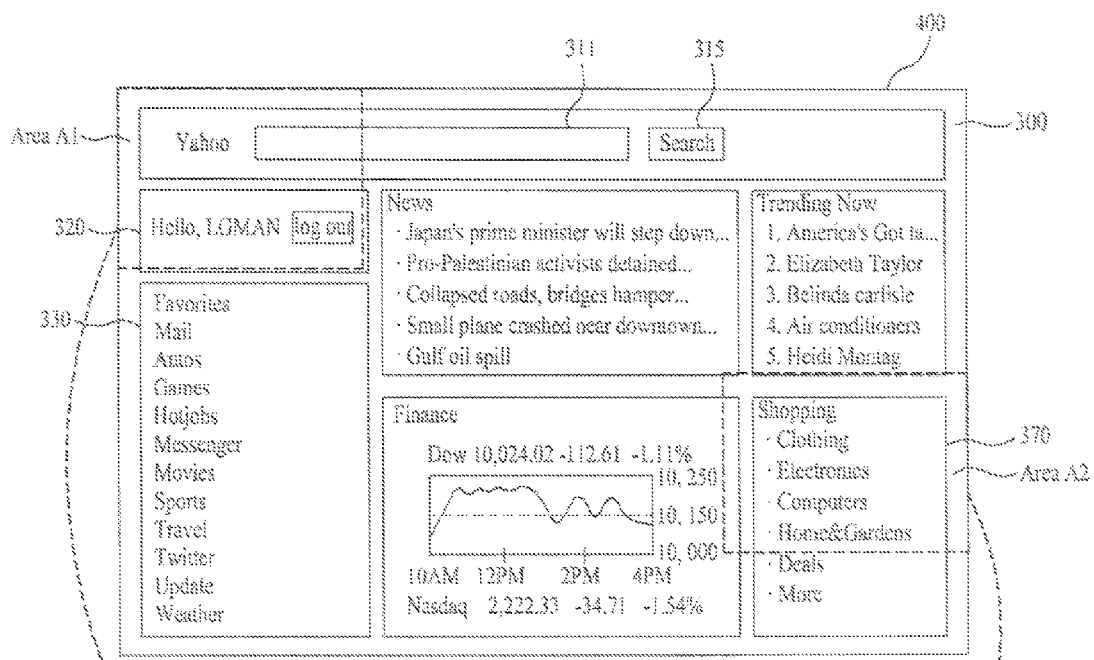
FIG. 11A
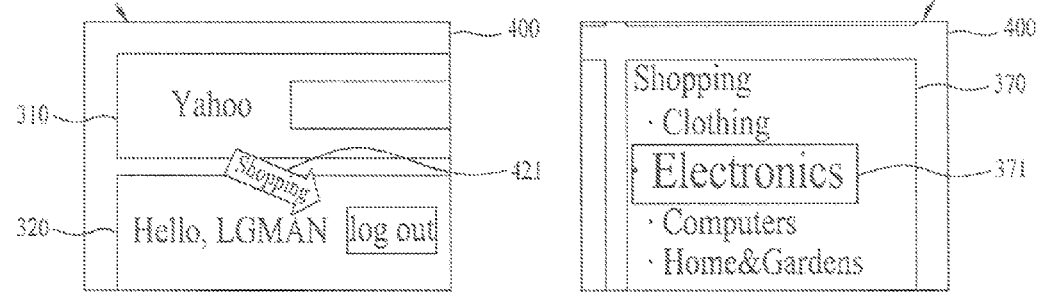
FIG. 11B
FIG. 11C

MOBILE TERMINAL AND METHOD OF CONTROLLING MOBILE TERMINAL

Pursuant to 35 U.S.C. §119(a), this application claims the benefit of earlier filing date and right of priority to Korean Application No. 10-2010-0053780, filed on Jun. 8, 2010, the contents of which are hereby incorporated by reference herein in their entireties.

FIELD OF THE INVENTION

Embodiments of the present invention relate to a mobile terminal, and more particularly, to a mobile terminal and a method of controlling the mobile terminal. Although features disclosed herein are suitable for a wide scope of applications, they are particularly suitable for configuring a terminal to improve and enhance convenience of usage by a user.

DISCUSSION OF THE RELATED ART

A mobile terminal is a device which may be configured to perform various functions. Examples of such functions include facilitating data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to the degree to which they are mobile or non-mobile. The mobile terminals can be further classified into handheld terminals and vehicle mount terminals according to their manner of portability.

There are ongoing efforts to support and increase the functionality of mobile terminals. Such efforts include software and hardware improvements, as well as changes and improvements in the structural components which form the mobile terminal.

An increasing number of Internet-accessible mobile terminals are available or are to be available. However, when a webpage is displayed on a mobile terminal, too many contents of the webpage may be displayed on the mobile terminal's display screen, which has a limited size. Due to this reason, it may be inconvenient for a user of the mobile terminal to interact with the webpage upon viewing the webpage.

SUMMARY

Accordingly, embodiments of the present invention are directed to a mobile terminal and a method of controlling a mobile terminal that substantially obviate one or more problems due to limitations and disadvantages of the related art. Further, embodiments are directed toward facilitating viewing of a webpage on a size-limited display screen of a mobile terminal.

One aspect of the present invention is directed to providing a mobile terminal and a method of controlling a mobile terminal, whereby a user of the mobile terminal can more conveniently interact with a webpage displayed on a size-limited display screen, particularly if the webpage has a relatively large amount of content. Additional aspects and features of the present invention will be set forth in part in the description which follows and will become apparent to those having ordinary skill in the art upon examination of the following.

The aspects and features of the present invention may be realized and attained by structures described herein and the presented claims, as well as in the appended drawings.

According to one embodiment, a mobile terminal includes: a display unit configured to display a webpage having a plurality of sections; a wireless communication unit configured to provide Internet access; a memory unit configured to store history information regarding usage of the webpage; and a control unit configured to control a display of a preferred section of the plurality of sections of the webpage upon an access of the webpage such that the preferred section is visually distinguishable from other sections of the plurality of sections, wherein display of the preferred section is based on the stored history information.

According to one embodiment, a mobile terminal includes: a display unit configured to display a webpage; a wireless communication unit configured to provide Internet access; a memory unit configured to store history information regarding usage of the webpage; and a control unit configured to: determine a usage pattern based on the stored history information when the webpage is accessed; and predict a next use command to be input and control display of an object or section of the webpage for receiving the predicted next use command such the object or section is visually distinguishable from other objects or sections displayed on the display unit when a use command for the webpage is input, wherein the next use command is predicted based on the determined usage pattern.

According to one embodiment, a method of controlling a mobile terminal includes: storing history information regarding usage of a webpage having a plurality of sections; accessing the webpage via the Internet; and displaying a preferred section of the plurality of sections of the webpage upon the access of the webpage such that the preferred section is visually distinguishable from other sections of the plurality of sections, wherein displaying the preferred section is based on the stored history information.

According to one embodiment, a method of controlling a mobile terminal includes: storing history information regarding usage of a webpage; accessing the webpage via the Internet; determining a usage pattern based on the stored history information when the webpage is accessed; predicting a next use command to be input based on the determined usage pattern when a use command for the webpage is input; and displaying an object or section of the webpage for receiving the predicted next use command such the object or section is visually distinguishable from other displayed objects or sections.

It is to be understood that both the foregoing general description and the following detailed description are exemplary and explanatory and are intended to provide further explanation of embodiments of the present invention.

BRIEF DESCRIPTION OF THE DRAWINGS

The accompanying drawings, which are included to provide a further understanding of embodiments of the present invention and are incorporated in and constitute a part of this application, illustrate embodiment(s) of the invention and together with the description serve to explain the principles of the invention. The above and other aspects, features, and advantages of the present invention will become more apparent upon consideration of the following description of various embodiments, taken in conjunction with the accompanying drawing figures. In the drawings:

FIGS. 11A, 11B and 11C are diagrams illustrating screen configurations of a display screen of a mobile terminal in which a method of controlling the mobile terminal according to an embodiment of the present invention is implemented;

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. As used herein, the suffixes 'module', 'unit' and 'part' are used for referring to elements only in order to facilitate the disclosure. Therefore, significant meanings or roles are not given to the suffixes themselves, and it is understood that the 'module', 'unit' and 'part' can be used together or interchangeably.

Embodiments of the present invention can be applicable to various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
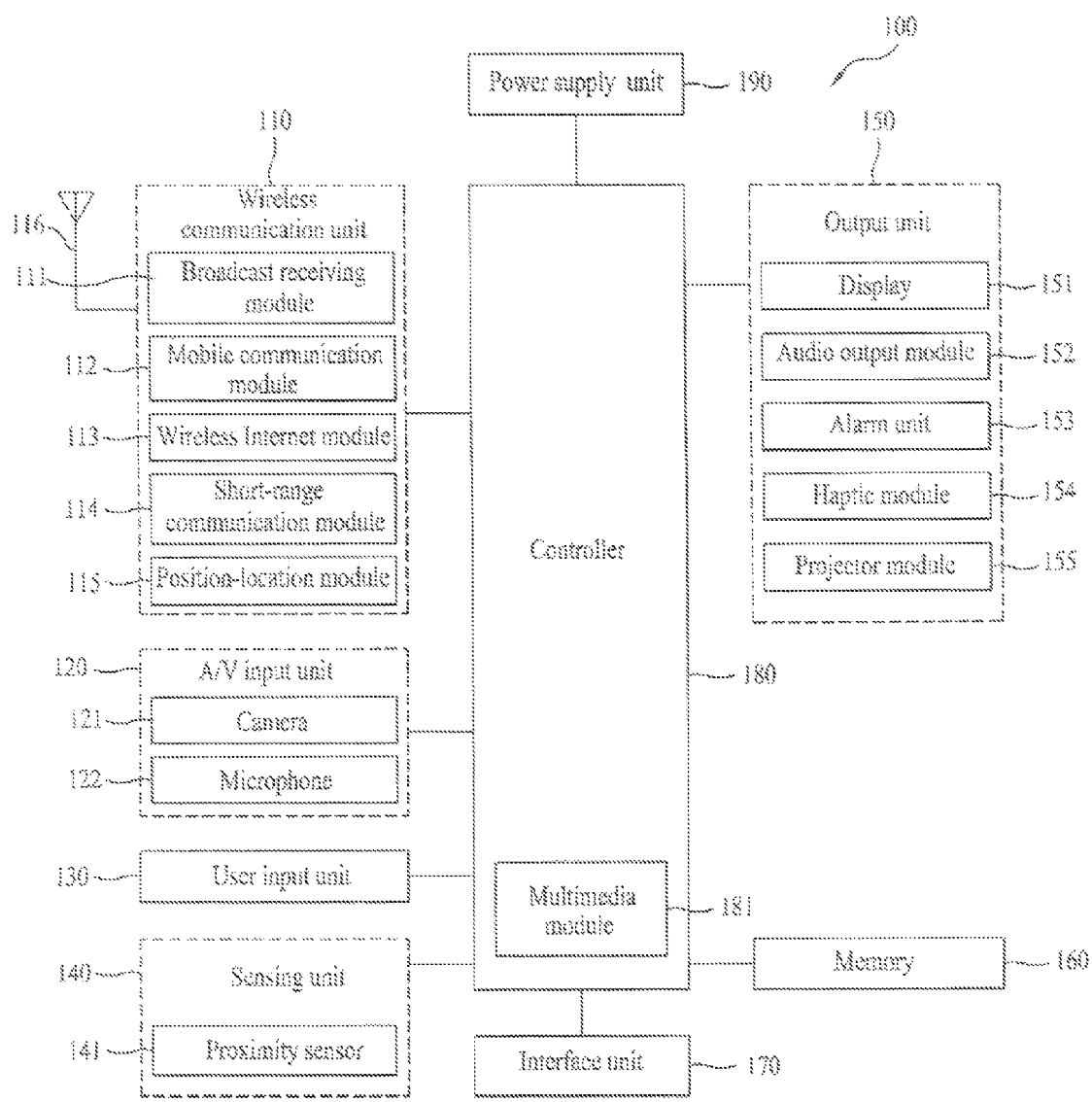
FIG. 1 is a block diagram of a mobile terminal 100 in accordance with an embodiment of the present invention.

FIG. 1 is a block diagram of a mobile terminal 100 in accordance with an embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in a suitable device, such as a memory 160.

The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcasting-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

At least two broadcast receiving modules 111 may be provided in the mobile terminal 100 to facilitate simultaneous reception of at least two broadcast channels or broadcast channel switching.

The mobile communication module 112 transmits/receives wireless signals to/from one or more network entities (e.g., a base station, an external terminal, or a server) via a mobile network implementing GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, and LTE (Long Term Evolution).

Wireless Internet access by Wibro™, HSPDA, GSM, CDMA, WCDMA, or LTE is achieved via a mobile communication network. In this regard, it is understood that the wireless internet module 113 configured to perform the wireless Internet access via the mobile communication network may be a form of the mobile communication module 112.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module.

According to current technology, a GPS module is able to precisely calculate current 3-dimensional position information based on at least longitude, latitude or altitude and direction (or orientation) by calculating distance information and precise time information from at least three satellites and then applying triangulation to the calculated information. Currently, location and time information are calculated using three satellites, and errors of the calculated location position and time information are then corrected using another satellite. Also, the GPS module is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes (or produces) image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition mode. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 includes a proximity sensor 141.

The output unit 150 generates output relevant to the senses of sight, hearing, and touch. The output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays 151 can be implemented as a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') is configured as a mutual layer structure (hereinafter called 'touchscreen'), the display 151 is usable as an input device as well as an output device. In this case, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller (not shown). The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include at least a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor 141.

In the following description, for purposes of clarity, an action in which a pointer that approaches the touchscreen without contacting the touchscreen is referred to as 'proximity touch'. Furthermore, an action in which a pointer actually touches the touchscreen is referred to as 'contact touch'. The position on the touchscreen that is proximity-touched by the pointer refers to the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm 153 outputs a signal for announcing the occurrence of a particular event associated with the mobile terminal 100. Typical events include a call received, a message received and a touch input received. The alarm 153 is able to output a signal for announcing the event occurrence by way of vibration as well as video or audio signal. The video or audio signal can be output via the display 151 or the audio output module 152. Hence, the display 151 or the audio output module 152 can be regarded as a part of the alarm 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with one embodiment of the mobile terminal 100.

The projector module 155 is an element for performing an image projector function using the mobile terminal 100. The projector module 155 is able to display an image, which is identical to or at least partially different from the image displayed on the display 151, on an external screen or wall according to a control signal of the controller 180.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may store a web browser related program for displaying a webpage received by accessing an external server via the wireless communication unit 110. Moreover, when the webpage displayed on the display 151 is used by a terminal user, history information on a use of the webpage can be cumulatively compiled as a database and stored in the memory 160.

For purposes of clarity, in the following description, the history information on the webpage use shall be referred to as a webpage use history database. Each time the terminal user uses the webpage, the webpage use history database can be updated according to a manner of the use. Information stored in the webpage use history database may be sorted in a per-webpage basis.

When a specific webpage is displayed, information related to a number of times each section on the specific webpage is used by a terminal user and information related to a number of times each object on the specific webpage is used by the terminal user can be stored in the webpage use history database. The most frequently used section/object may be understood as a preferred section/object on the specific webpage. The preferred section/object can include the section/object cumulatively and frequently used among initially used sections/objects each time the specific webpage is accessed.

In the webpage use history database, when a specific webpage is displayed, information regarding a usage pattern of a plurality of sections and objects on the specific webpage can be stored in the webpage use history database. When one section/object is used on the specific webpage, information regarding an expected section/object that is expected to be used next is one example of the usage pattern. When a prescribed user command is input to the specific webpage, information on an expected section/object that is expected to be used next is another example of the usage pattern.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component. Moreover, the controller 180 is able to perform a pattern (or image) recognizing process for recognizing a writing input and a picture drawing input carried out on the touchscreen as characters or images, respectively.

In displaying a specific webpage accessed via the Internet, the controller 180 is able to use the webpage use history database. For instance, when a webpage displayed on the display 151 is used by a terminal user, the controller 180 may control the webpage use history database such that it is cumulatively updated.

When a specific webpage is accessed, the controller 180 checks a use history of the specific webpage by referring to the webpage use history database. Accordingly, the controller 180 may control the display 151 to display a preferred section on the specific webpage, initially upon access of the specific webpage, in a manner such that the preferred section is visually distinguishable among a plurality of sections of the specific webpage.

When a specific webpage is accessed, the controller 180 checks a use history of the specific webpage by referring to the webpage use history database, in order to analyze (or determine) a usage pattern based on the use history of the specific webpage. When a use command for the specific webpage is input, the controller predicts a next use command according to the analyzed usage pattern and is then able to control the display 151 to display a specific object or section on the specific webpage for receiving an input of the predicted use command. The specific object or section may be displayed in a manner such that it is visually distinguishable (e.g., from other objects or sections). These features will be described in more detail later.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
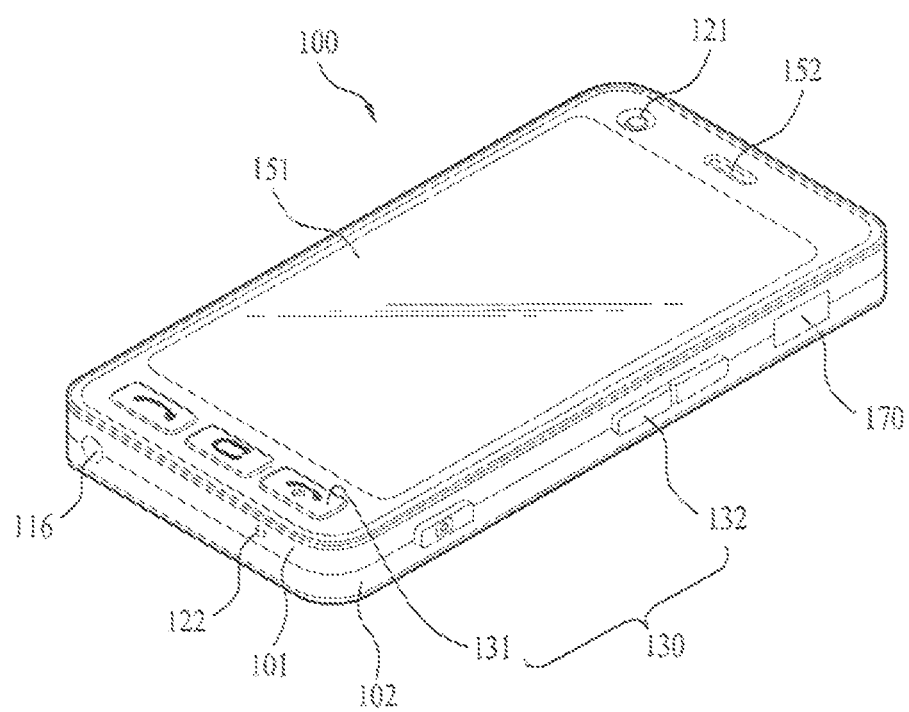
FIG. 2A is a front perspective view of a mobile terminal according to one embodiment of the present invention.

FIG. 2A is a front perspective view of a mobile terminal according to one embodiment of the present invention. The mobile terminal 100 illustrated in FIG. 2A has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2A, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (or volume) provided between the front and rear cases 101 and 102. Optionally, at least one middle case can be further provided between the front and rear cases 101 and 102. The cases 101 and 102 may be formed by injection molding of synthetic resin or may be formed of a metallic substance such as stainless steel (STS) or titanium (Ti), for example.

A display 151, an audio output module 152, a camera 121, a user input unit 130, a microphone 122, and an interface unit 170 can be provided at the terminal body, and, more particularly, on the front case 101. Manipulating units 131 and 132 (see, e.g., FIG. 2A) may be part of the user input unit 130 (see, e.g., FIG. 1). The display 151 occupies most of a main face of the front case 101. The audio output unit 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 may be manipulated (or operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by the first or second manipulating unit 131 or 132 can be divided between the two. For instance, a command such as start, end, and scroll is input to the first manipulating unit 131. Furthermore, a command for a volume adjustment of sound output from the audio output unit 152, or a command for a switching to a touch recognizing mode of the display 151 can be input to the second manipulating unit 132.

Figure 2B:
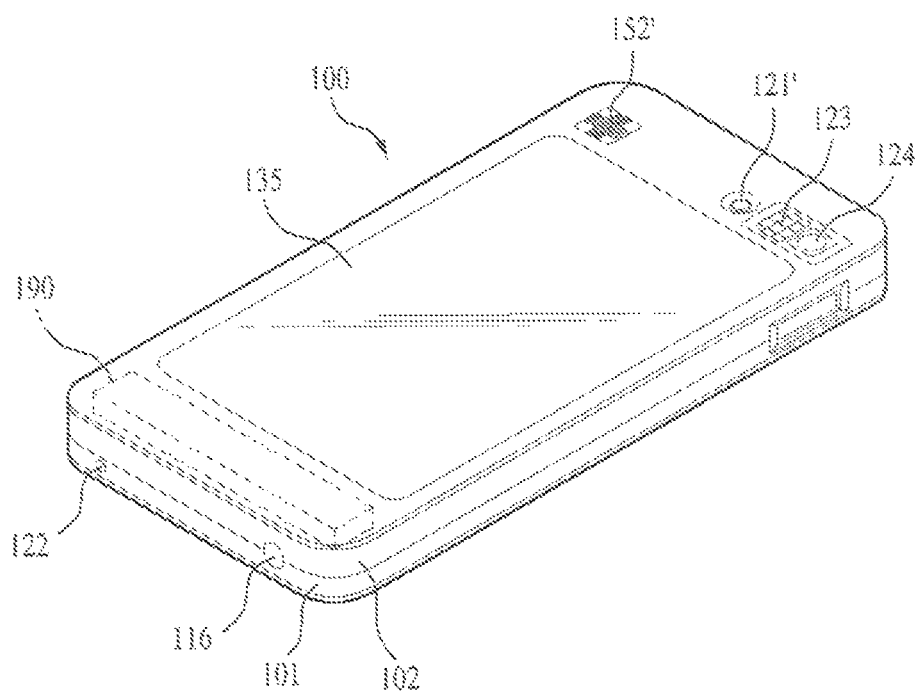
FIG. 2B is a rear perspective view of the terminal of FIG. 2A.

FIG. 2B is a rear perspective view of the terminal of FIG. 2A. Referring to FIG. 2B, a camera 121' can be additionally provided at a rear of the terminal body, and, more particularly, at the rear case 102. The camera 121' captures images along a direction that is substantially opposite to that of the camera 121 shown in FIG. 2A and may have a pixel resolution different from the resolution of the camera 121.

According to one embodiment, for instance, the camera 121 has a relatively low number of pixels sufficient to capture and transmit a picture of a user's face for a video call, while the camera 121' has a relatively high number of pixels for capturing a photograph of a general subject. Furthermore, each of the cameras 121 and 121' can be installed on the terminal body to be rotated or popped up.

A flash 123 and a mirror 124 are additionally provided adjacent to the camera 121'. The flash 123 projects light toward a subject for photographing the subject using the camera 121'. When a user attempts to take a picture of the user (self-photography) using the camera 121', the mirror 124 enables the user to view the user's face as reflected by the mirror 124.

An additional audio output unit 152' can be provided at the rear of the terminal body. The additional audio output unit 152' is for implementing a stereo function together with the audio output unit 152 shown in FIG. 2A and may be used for implementation of a speakerphone mode when speaking over the terminal.

A broadcast signal receiving antenna 116 can be additionally provided at the lateral side of the terminal body as well as an antenna for communication. The antenna 116 may constitute a portion of the broadcast receiving module 111 shown in FIG. 1 and be retractable into the terminal body.

A power supply unit 190 for supplying a power to the terminal 100 is provided at the terminal body. Furthermore, the power supply unit 190 can be configured to be built within the terminal body. Alternatively, the power supply unit 190 can be configured to be detachably connected to the terminal body.

A touchpad 135 for detecting a touch can be additionally provided at the rear case 102. The touchpad 135 can be configured as a light transmittive type similar to the display 151. In this case, if the display 151 is configured to output visual information from both of its faces, the visual information is viewable via the touchpad 135 as well. The information output from both of the faces can be entirely controlled by the touchpad 135. Alternatively, a display may be further provided for the touchpad 135 so that a touchscreen can be provided on the rear case 102 as well.

The touchpad 135 is activated by interconnecting with the display 151 of the front case 101. The touchpad 135 can be provided at the rear of the display 151 to extend parallel to the display 151. The touchpad 135 can have a size equal to or smaller than the size of the display 151.

If the display 151 includes a touchscreen, implementation of features described later may be more readily facilitated. Therefore, the following description is provided with reference to a display 151 that includes a touchscreen. A display screen displayed by the touchscreen 151 is labeled as corresponding to reference number 400 in various figures and portions of the following description.

Figure 3:
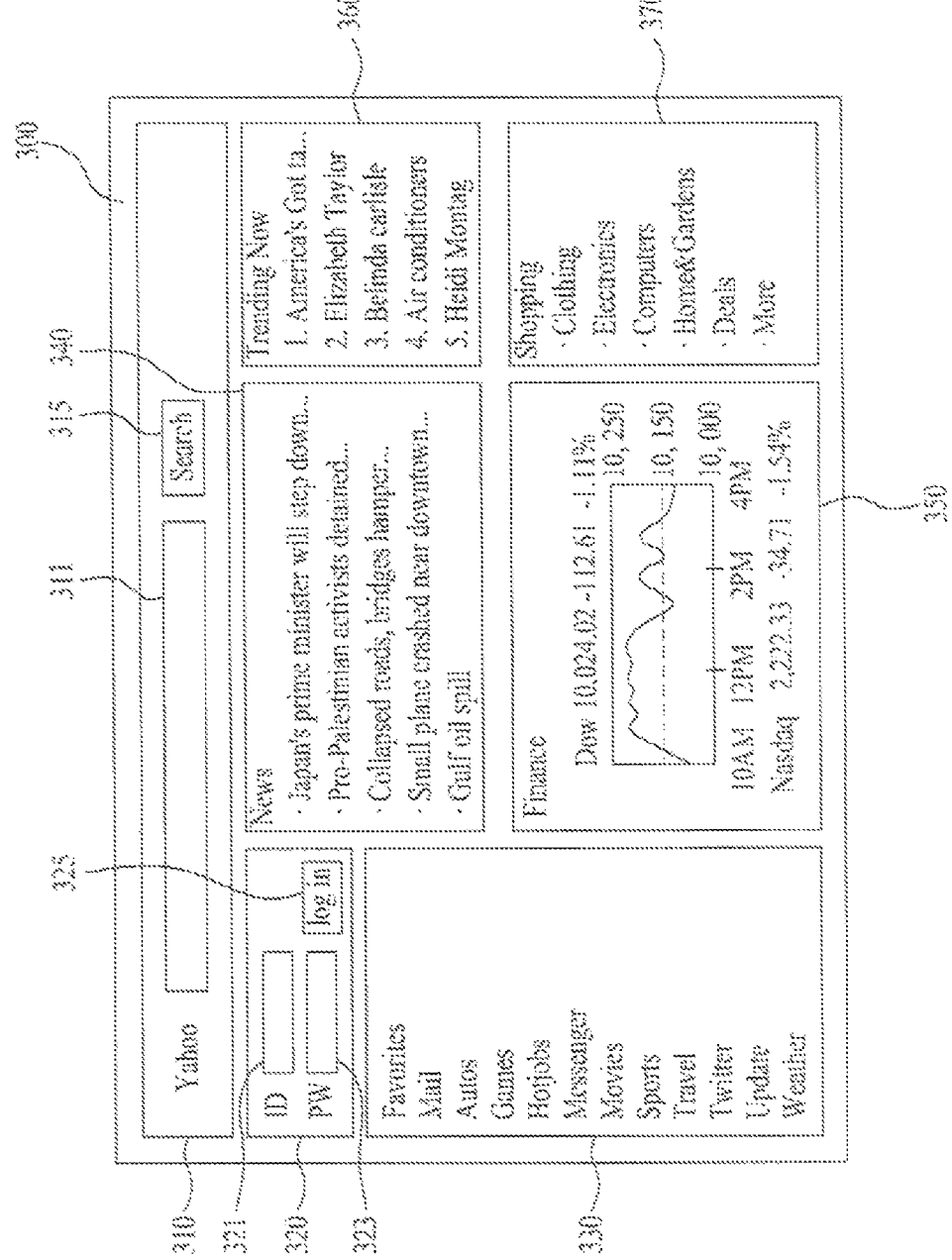
FIG. 3 is a representative view of a webpage displayed using a method of controlling a mobile terminal according to an embodiment of the present invention.

An entire specific webpage that is displayable on the mobile terminal 100 when the mobile terminal accesses the specific webpage via the Internet is now described with reference to FIG. 3. FIG. 3 is a representative view of a webpage 300 displayed using a method of controlling a mobile terminal according to an embodiment of the present invention.

Referring to FIG. 3, the mobile terminal 100 accesses the Internet via the wireless communication unit 110, receives a webpage, and then displays the received webpage. According to one embodiment, no limitation is enforced on webpages that are displayable on the mobile terminal 100. For ease of description, an exemplary webpage 300 displayed on the mobile terminal 100 is described with reference to FIG. 3.

The mobile terminal 100 accesses the Internet and is then able to receive the specific webpage 300 shown in FIG. 3. The specific webpage 300, as shown in FIG. 3, may include a plurality of sections 310, 320, 330, 340, 350, 360 and 370. Each of the sections may correspond to a basic frame module constituting the webpage 300.

A border of each of the sections, as shown in FIG. 3, is outlined to indicate a boundary. Therefore, a region of the corresponding section can be clearly and visually distinguishable from regions of the other sections. It is not mandatory that the corresponding region be clearly distinguishable from other regions of the other sections. That is, it is not required that the outlined border of the corresponding section be clearly shown in the webpage.

Each of the sections 310, 320, 330, 340, 350, 360 and 370 can include at least one or more subsections. The specific webpage 300, as shown in FIG. 3, can include objects such as text input boxes 311, 321 and 323, icons 315 and 325 and links (e.g., a link within each section). The object can refer to a user interface (hereinafter abbreviated as UI) enabling a user of the mobile terminal 100 to interact with the specific webpage while the specific webpage is displayed. If the display 151 includes a touchscreen, the user is able to interact with the object by touching the corresponding object on the touchscreen.

Figure 4:
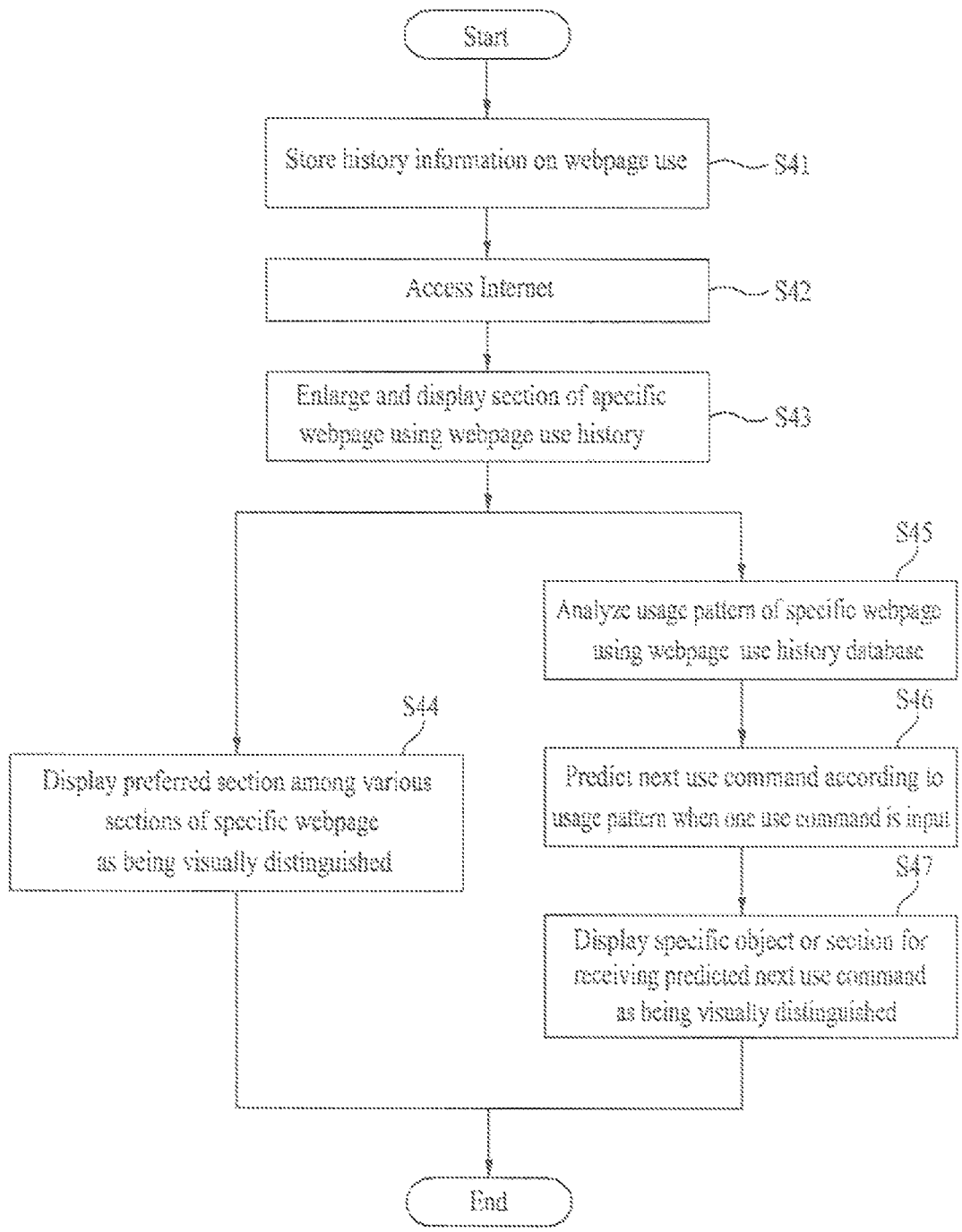
FIG. 4 is a flowchart of a method of controlling a mobile terminal according to an embodiment of the present invention.

In the following description, embodiments relating to a method of controlling a mobile terminal, which can be implemented in the mobile terminal, are explained in more detail with reference to FIGS. 4, 5, 6 and 7. FIG. 4 is a flowchart of a method of controlling a mobile terminal 100 according to an embodiment of the present invention. FIGS. 5, 6 and 7 are diagrams illustrating screen configurations of a display screen of a mobile terminal in which a method of controlling the mobile terminal according to an embodiment of the present invention is implemented.

Figure 5A:
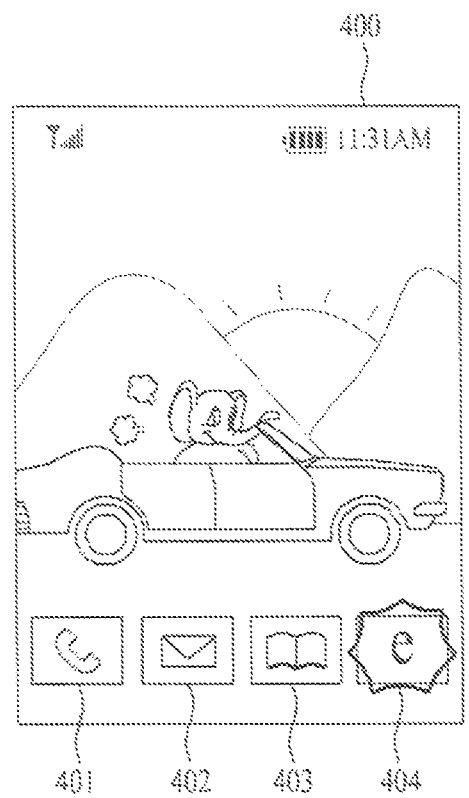
FIGS. 5A, 5B, 5C, 6A, 6B, 6C, 6D, 7A and 7B are diagrams illustrating screen configurations of a display screen of a mobile terminal in which a method of controlling the mobile terminal according to an embodiment of the present invention is implemented.

As described earlier, when a webpage is used in the mobile terminal 100 by a user, the controller 180 controls the webpage use history database in advance in order to store (e.g., cumulatively store) history information (see FIG. 4 (S41)). Referring to FIG. 5A, while the mobile terminal 100 displays a standby image, an Internet access icon 404 is touched and selected from a plurality of icons 401, 402, 403 and 404, in order to initiate Internet access (see FIG. 4 (S42)).

For example, if the specific webpage is registered as a homepage of the mobile terminal 100, the mobile terminal 100 directly receives the specific webpage after the Internet is accessed and then displays the received specific webpage on the touchscreen. If the specific webpage is registered with favorites in the mobile terminal 100, the specific webpage is selected from a favorites list after the Internet is accessed such that the mobile terminal 100 receives and displays the specific webpage on the touchscreen. If the specific webpage is not registered as either a homepage or a favorite webpage in the mobile terminal 100, a user inputs a URL (uniform resource locator) of the specific webpage to the mobile terminal 100 so that the mobile terminal 100 directly receives and displays the specific webpage on the touchscreen. One skilled in the art would understand such processes based on the disclosure provided above, and further details regarding these processes will not be provided below.

Figure 5B:
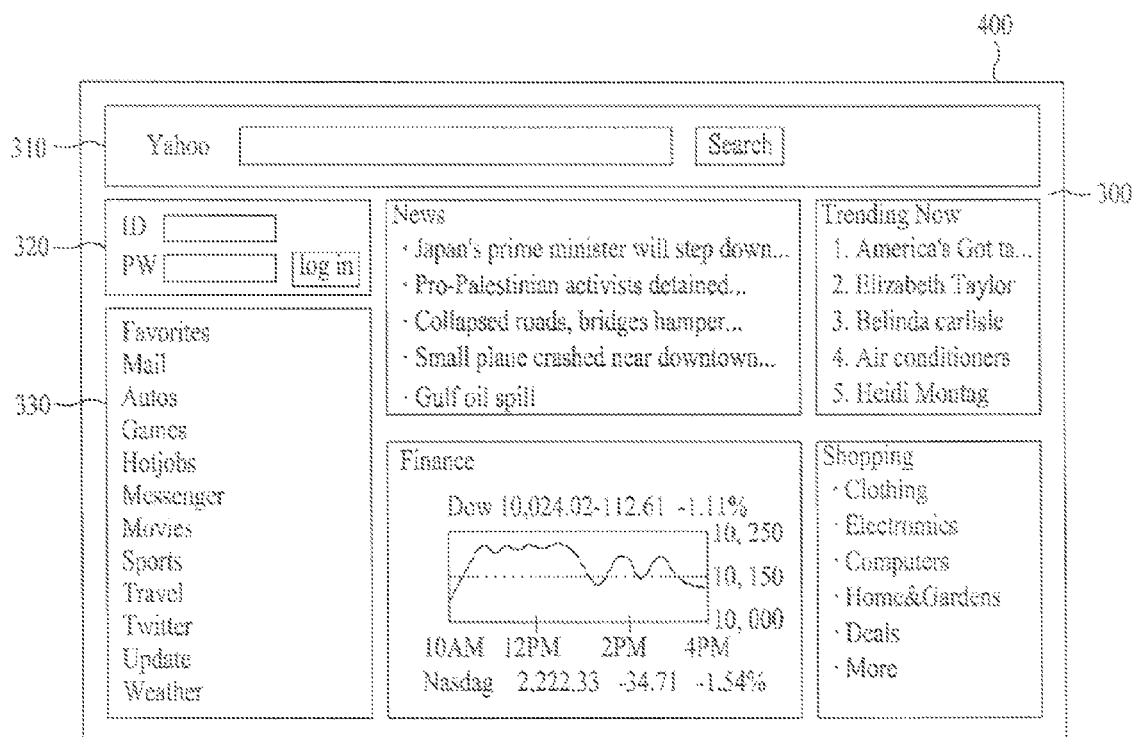

Referring to FIG. 5B, the specific webpage 300 shown in FIG. 3 may be reduced to be displayed in its entirety on the touchscreen 400. If a display screen size of the mobile terminal 100 is limited, the contents of displayed specific webpage may appear too small for the user to readily find a preferred section from a plurality of sections of the specific webpage.

According to one embodiment, when the specific webpage 300 is displayed, the controller 180 controls the display 151 to enlarge and display on the touchscreen 400 a section (i.e., a preferred section), which is preferred by the user among a plurality of the sections of the specific webpage, using the webpage use history database (see FIG. 4 (S43)). This is described in more detail as follows.

When the mobile terminal 100 accesses the specific webpage, the controller 180 refers to a use history of the specific webpage from the stored webpage use history database. Subsequently, the controller 180 obtains (or determines) the user's preferred section (e.g., a most frequently used section, a most used section over a long term) of the specific webpage from the use history.

Figure 5C:
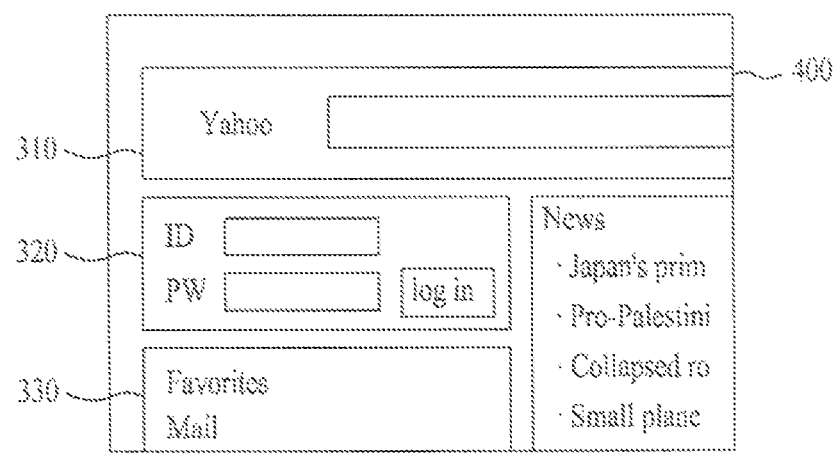

Referring to FIG. 5C, the controller 180 controls the display such that the preferred section is displayed as being visually distinguishable from other sections when the specific webpage 300 is displayed (see FIG. 4 (S44)). With reference to FIG. 5C, the preferred section is a login section 320, and the login section 320 is displayed as being visually distinguishable from other sections by zooming in on a portion of the specific webpage in which the login section 320 is approximately centered.

According to a particular embodiment, the login section 320 may be directly displayed initially upon access of the specific webpage in such a manner. According to a particular embodiment, the controller 180 controls the display 151 to zoom in on the preferred section (i.e., the login section 320) such that only the preferred section is displayed on the touchscreen 400.

Further embodiments of the present invention will be described with reference to FIGS. 6A, 6B, 6C and 6D. The controller 180 analyzes the usage pattern of the specific webpage using the webpage use history database (see FIG. 4 (S45)). Utilization of the analyzed usage pattern is described in more detail as follows.

Figure 6A:
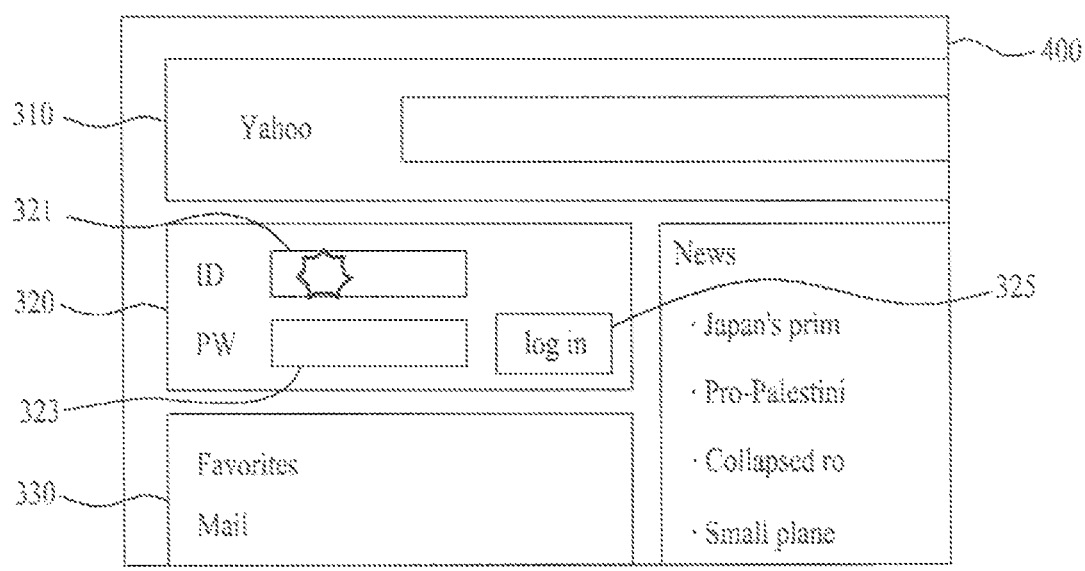

Referring to FIG. 6A, a login section 320 including an ID text input box 321 for inputting an ID is displayed on the touchscreen 400. As described earlier, a portion of the website in which the login section 320 is located is zoomed in. The displayed ID text input box 321 may be selected by touch. If the ID text input box 321 is selected, then, with reference to FIG. 6B, the display of the ID text input box 321 is further zoomed in (or enlarged) for the user's convenience.

A soft keypad 410 for inputting text in the zoomed-in ID text input box 321 may be displayed. If the user input unit 130 of the mobile terminal 100 is provided with a hard keypad (i.e., a physical keypad), the soft keypad 410 may not be displayed.

Figure 6B:
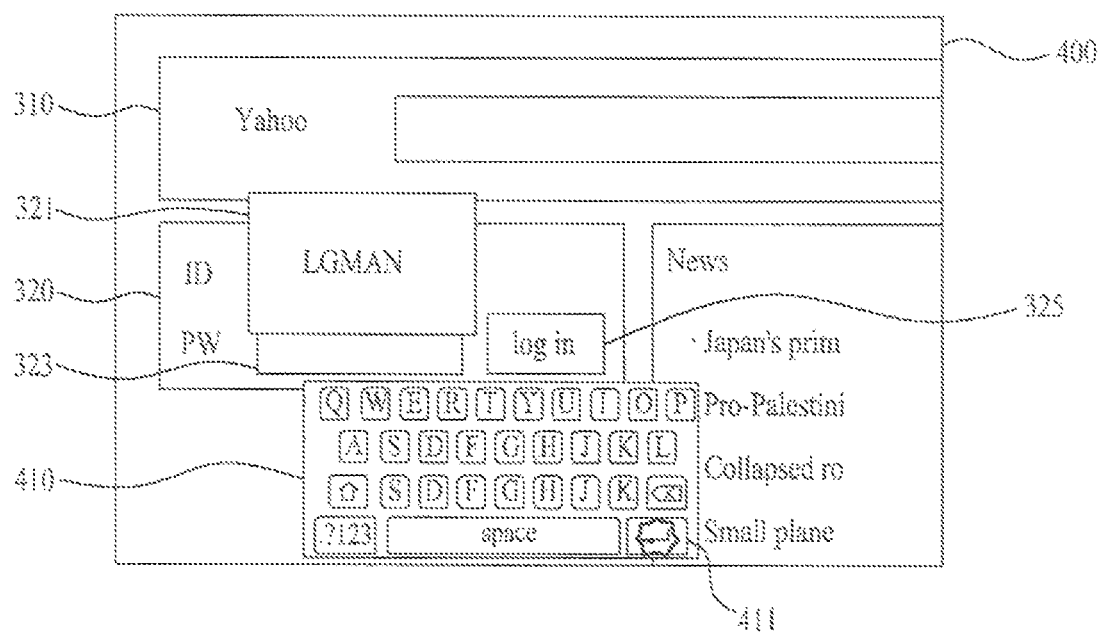

When the text input box 321 is zoomed in and displayed, the controller 180 controls the soft keypad 410 and the display such that text input in the text input box 321 is automatically displayed. After a particular ID (e.g., "LGMAN" as illustrated in FIG. 6B) has been input via the soft keypad 410, if an enter key 411 is touched, the input of the particular ID may be completed.

The webpage use history database may be updated per the input of the particular ID in the specific webpage. More particularly, information in the webpage use history database regarding the usage history of the specific webpage may be updated to reflect that the particular ID has been input. As described earlier, the webpage use history database may be continually updated to reflect the user's usage of the specific webpage.

When the input of the particular ID is completed, the controller 180 predicts the next use command that will be input by the user. The prediction may be based on the analyzed usage pattern. For instance, after a particular use command (i.e., entry of the particular ID) is input, the controller 180 predicts that a password input is a highly probable candidate for the next command to be input, based on the analyzed usage pattern (see, e.g., FIG. 4 (S46)).

Figure 6C:
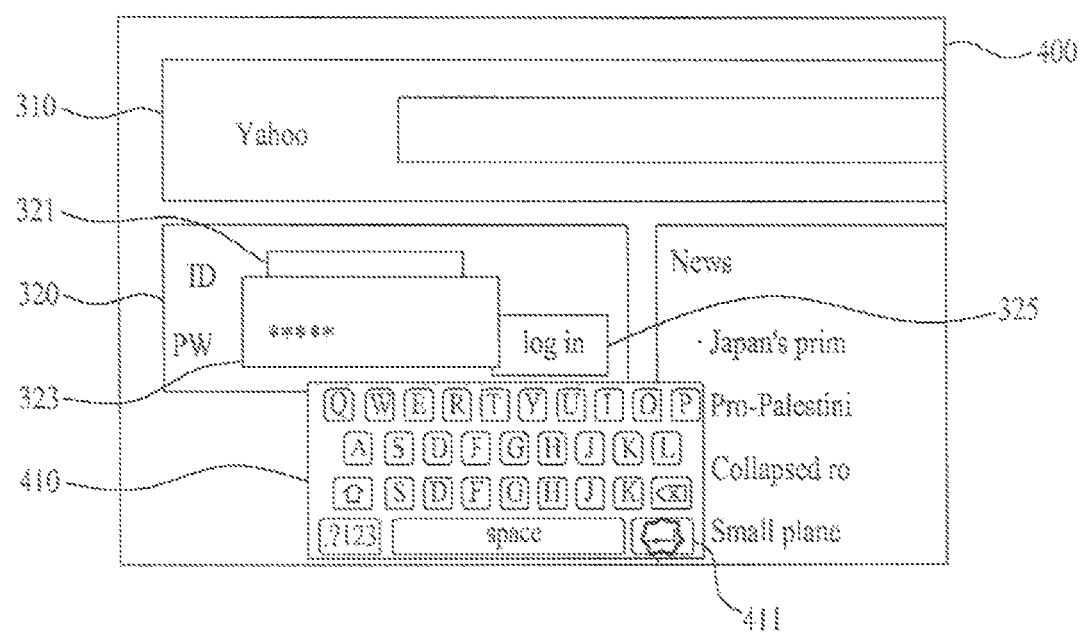

With reference to FIG. 6C, the controller 180 controls display of a password text input box 323 for the password input to be zoomed in (or enlarged) for the user's convenience (see, e.g., FIG. 4 (S47)). After a particular password (e.g., "***") has been input in the password text input box 323 via the soft keypad 410, if the enter key 411** is touched, the input of the particular password is completed.

When the input of the password is completed, the controller 180 predicts the next use command that will be input by the user. Again, the prediction may be based on the analyzed usage pattern (see, e.g., FIG. 4 (S46)). For instance, after a particular use command (i.e., entry of the password) is input, the controller 180 predicts that a selection of the login icon 325 is a strongest candidate for the next command to be input, based according to the analyzed usage pattern (see, e.g., FIG. 4 (S46)).

Figure 6D:
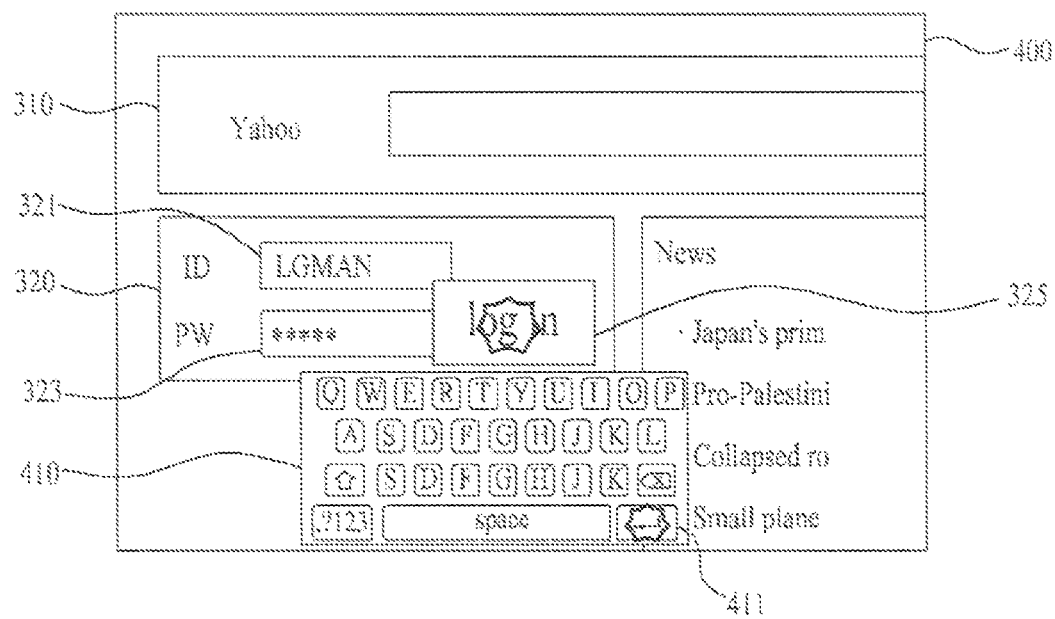

Referring to FIG. 6D, the controller 180 controls display of the login icon 325 to be zoomed in (or enlarged) for the user's convenience (see, e.g., FIG. 4 (S47)). If the login icon 325 is touched, the login procedure is completed. According to a further embodiment, when the login icon 325 is touched, the controller 180 controls display of the soft keypad 410 on the touchscreen 400 to cease.

Figure 7A:
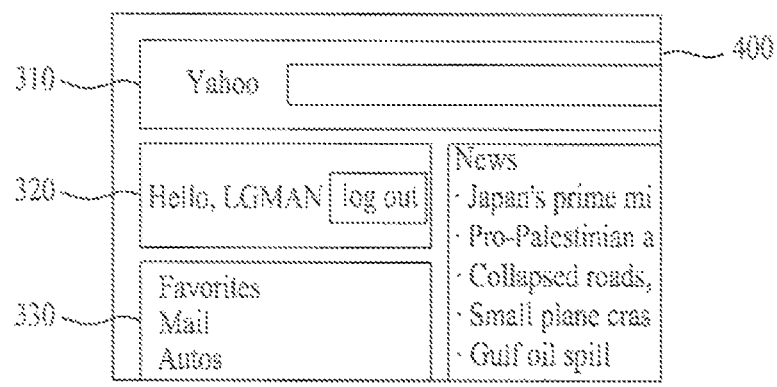
Figure 7B:
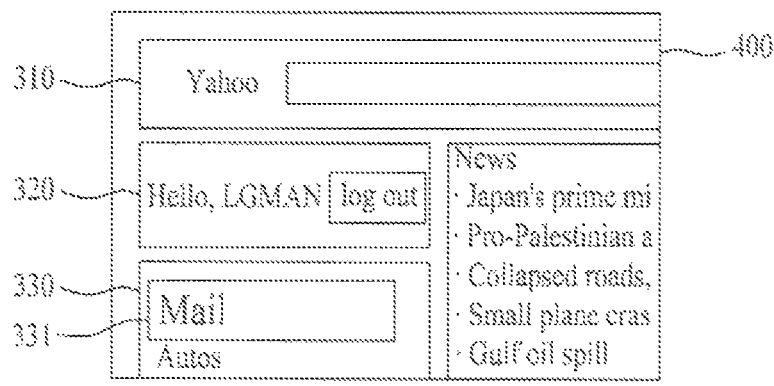

Further embodiments of the present invention will be described with reference to FIGS. 7A and 7B. Referring to FIG. 7A, when the login procedure is completed, a message (e.g., "Hello, LGMAN!") may be displayed on the login section 320 to indicate that the login procedure has been completed. In addition to displaying the login completion message, when the login procedure is completed, the controller 180 may predict the next use command that will be input by the user. Again, the prediction may be based on the analyzed usage pattern.

For instance, after the login procedure completion, according to the analyzed usage pattern, the controller 180 predicts that a selection of a mail link 331 in the favorites section 330 is a strongest candidate for the next use command. Referring to FIG. 7B, the controller 180 controls display of the mail link 331 to be zoomed in (or enlarged) for the user's convenience. Furthermore, if the mail link 331 is not selected by the user and, instead, the specific webpage is scrolled (or another object is touched), the controller 180 may return the display of the mail link 331 to its original size (e.g., the size before it was enlarged).

According to embodiments described earlier, when the mobile terminal 100 accesses the specific webpage 300, display of a preferred section of the specific webpage is controlled to be zoomed in (or enlarged), and display of corresponding objects are then zoomed in (or enlarged) sequentially according to the usage pattern. According to alternative embodiments, when the mobile terminal 100 accesses the specific webpage, the corresponding objects may be sequentially zoomed in and displayed without zooming in on the preferred section.

Figure 8A:
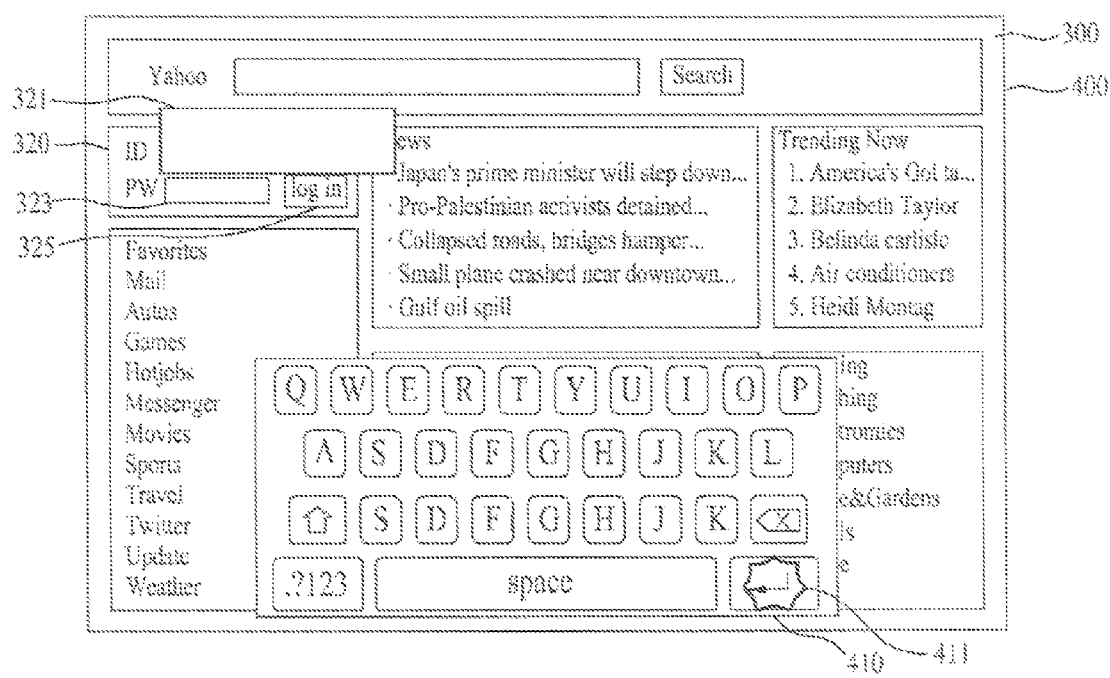
FIGS. 8A, 8B and 8C are diagrams illustrating screen configurations of a display screen of a mobile terminal in which a method of controlling the mobile terminal according to an embodiment of the present invention is implemented.
Figure 8B:
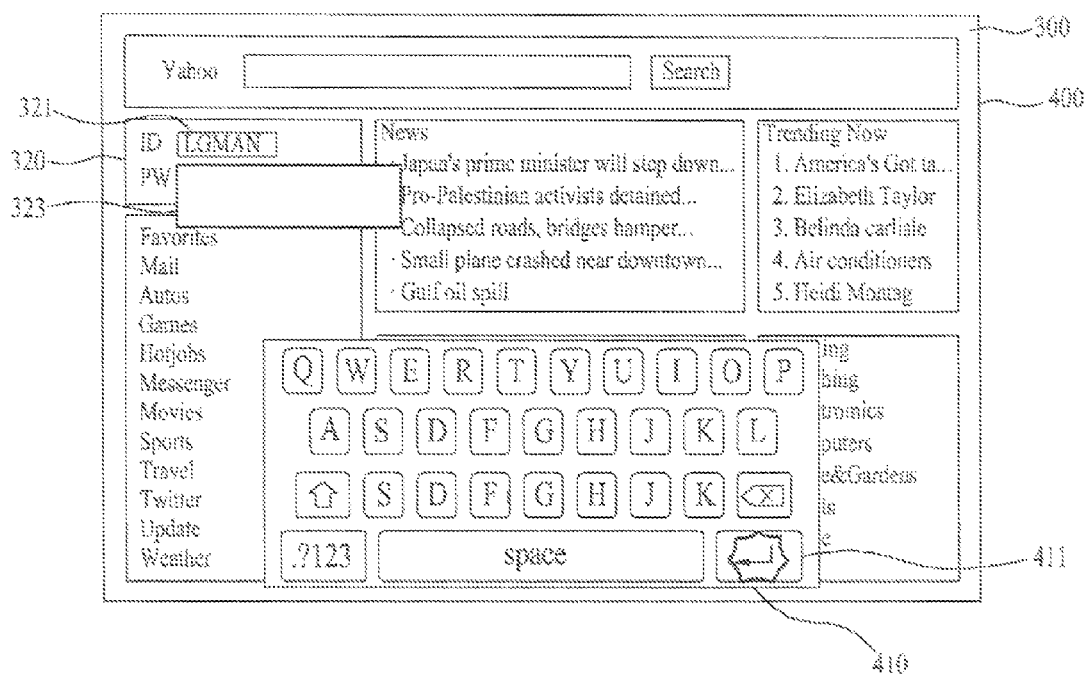
Figure 8C:
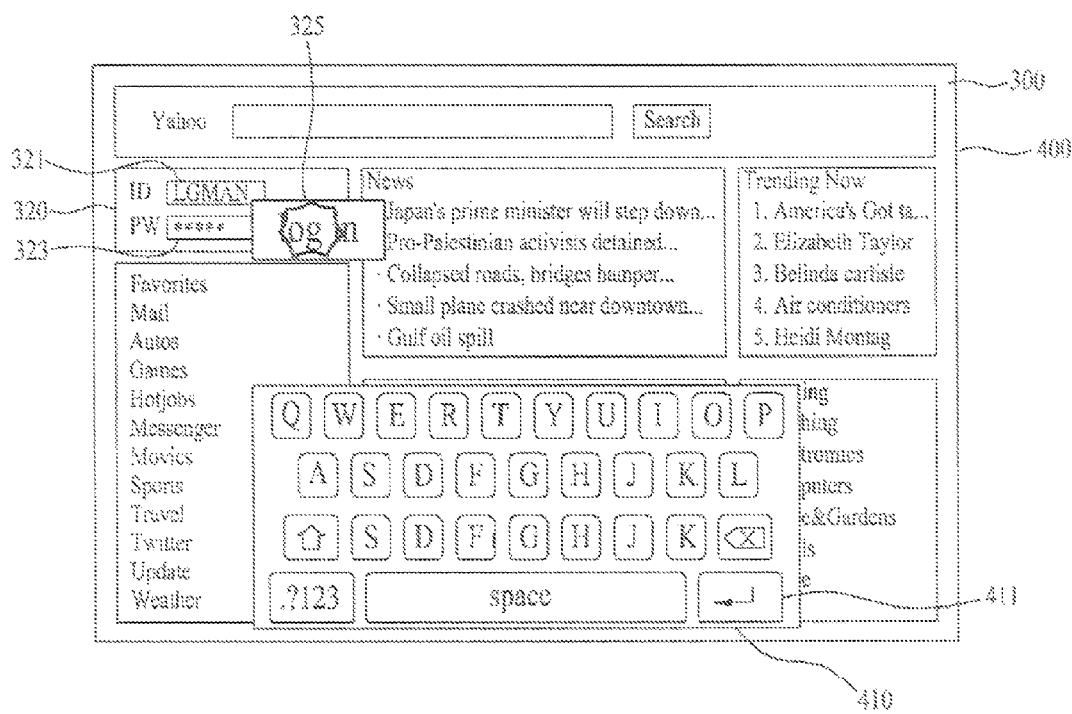

These alternative embodiments are described in more detail with reference to FIGS. 8A, 8B and 8C. FIGS. 8A, 8B and 8C are diagrams illustrating screen configurations of a display screen of a mobile terminal 100 in which a method of controlling the mobile terminal according to an embodiment of the present invention is implemented.

Referring to FIG. 8A, when the mobile terminal accesses a specific webpage 300, the specific webpage may be fully displayed on the entire screen of the touchscreen 400. The controller 180 may analyze a usage pattern of the specific webpage based on a usage history of the specific webpage. According to the analyzed usage pattern, the controller 180 predicts a use command that will be input after the specific webpage is accessed.

For instance, after the access to the specific webpage 300 is performed, the controller 180 may predict that an ID input is a strongest candidate for the next use command to be input, based according to the analyzed usage pattern. Accordingly, referring to FIG. 8A, the controller 180 controls display of the ID text input box 321 to be zoomed in (or enlarged). The controller 180 may also control the display to display the soft keypad 410.

According to a particular embodiment, when the mobile terminal 100 accesses the specific webpage 300, the display of the ID text input box 321 is zoomed in (or enlarged) as soon as the specific webpage is displayed on the entire screen of the touchscreen 400. The soft keypad 410 for input of the ID may be displayed as well.

After completion of the ID input, the controller 180 may predict that input of a password is a strongest candidate for the next use command that will be input by the user. Accordingly, referring to FIG. 8B, the controller 180 controls display of the password text input box 323 to be zoomed in (or enlarged). As illustrated in FIG. 8B, display of the soft keypad 410 may be maintained.

After completion of the password input, the controller 180 may predict that a selection of the login icon 325 is a strongest candidate for the next use command that will be input by the user. Accordingly, referring to FIG. 8C, the controller 180 controls display of the login icon 325 to be zoomed in (or enlarged). As illustrated in FIG. 8C, display of the soft keypad 410 may be maintained. According to an alternative embodiment, when display of the login icon 325 is zoomed in (or enlarged) or after the login icon 325 has been selected, display of the soft keypad 410 may be terminated.

Returning to FIG. 8A, when the specific webpage 300 is displayed, a user may not wish to perform a login procedure. For example, another section of the specific webpage may be touched and selected by the user. If a user input corresponding to something other than the login procedure is input to the specific webpage, the controller 180 returns the display of the ID text input box 321 to its original size. Also, the controller 180 may terminate the display of the soft keypad 410.

According to the embodiments disclosed with reference to FIGS. 8A, 8B and 8C, when the mobile terminal 100 accesses the specific webpage 300, display of a particular object is zoomed in (or enlarged) according to a use history of the specific webpage as soon as the specific webpage is displayed on the screen. The display of other portions of the specific webpage is not zoomed in (or enlarged). Further embodiments will be described in more detail with reference to FIGS. 9A, 9B, 9C, 10A, 10B and 10C.

FIGS. 9A, 9B, 9C, 10A, 10B and 10C are diagrams illustrating screen configurations of a display screen of a mobile terminal 100 in which a method of controlling the mobile terminal according to an embodiment of the present invention is implemented.

Figure 9A:
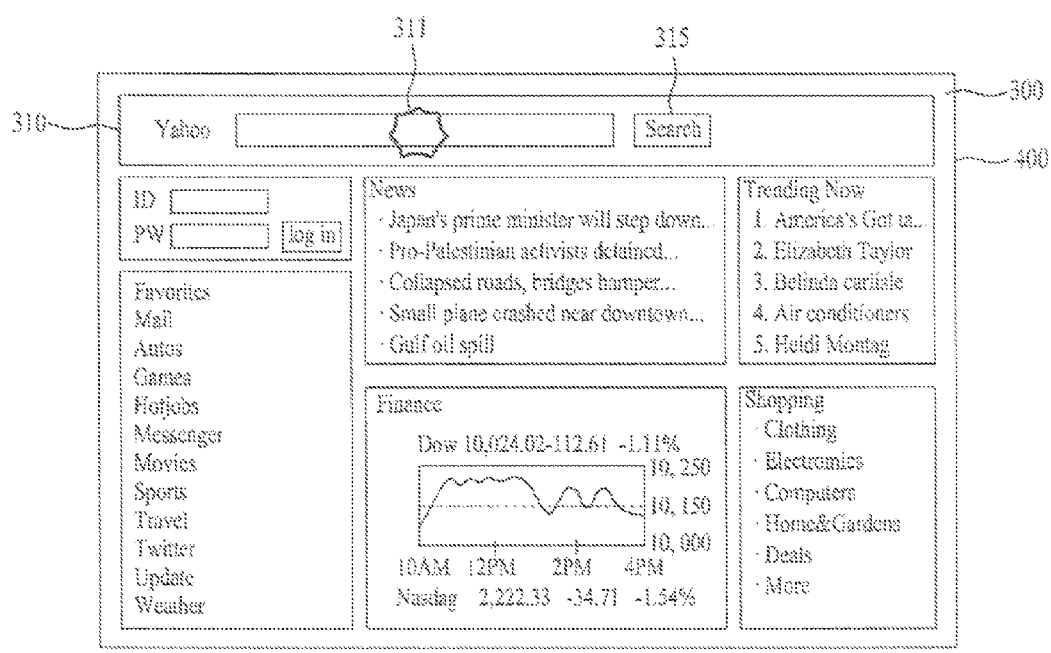
FIGS. 9A, 9B, 9C, 10A, 10B and 10C are diagrams illustrating screen configurations of a display screen of a mobile terminal in which a method of controlling the mobile terminal according to an embodiment of the present invention is implemented.

Referring to FIG. 9A, when the mobile terminal 100 accesses the specific webpage 300, the specific webpage may be fully displayed on the entire screen of the touchscreen without zooming in any particular portion of the specific webpage. A search word text input box 311 of a search section 310 may be touched and selected, by the user, from the specific webpage displayed on the touchscreen 400.

Figure 9B:
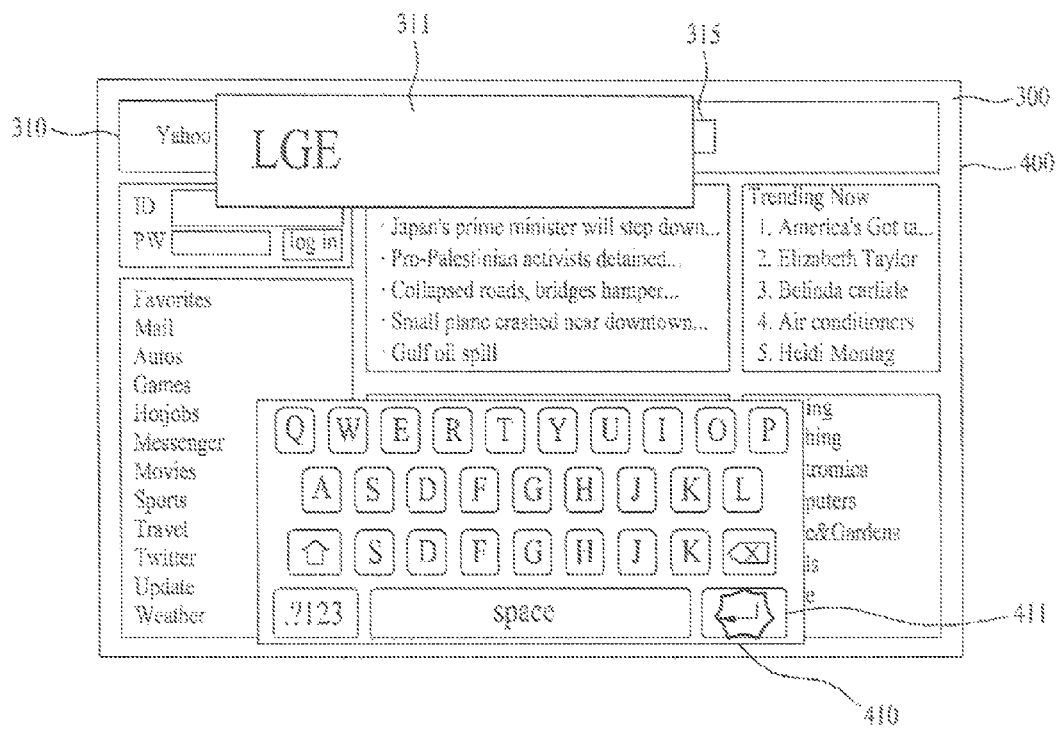

Accordingly, referring to FIG. 9B, display of the selected search word text input box 311 is zoomed in (or enlarged) on the touchscreen 400. Further, a soft keypad 410 for inputting search words to the search word text input box 311 may be displayed on the touchscreen 400. By inputting a particular search word (e.g., "LGE") via the soft keypad 410 and then touching an enter key 411, the input of the search word can be completed.

After the search word input has been completed, the controller 180 predicts the next use command that will be input by the user, based on the analyzed usage pattern. For instance, after the user has input the desired search word, the controller 180 may predict that a selection of the search icon 315 is a strongest candidate for the next use command that will be input by the user, based according to the analyzed usage pattern.

Figure 9C:
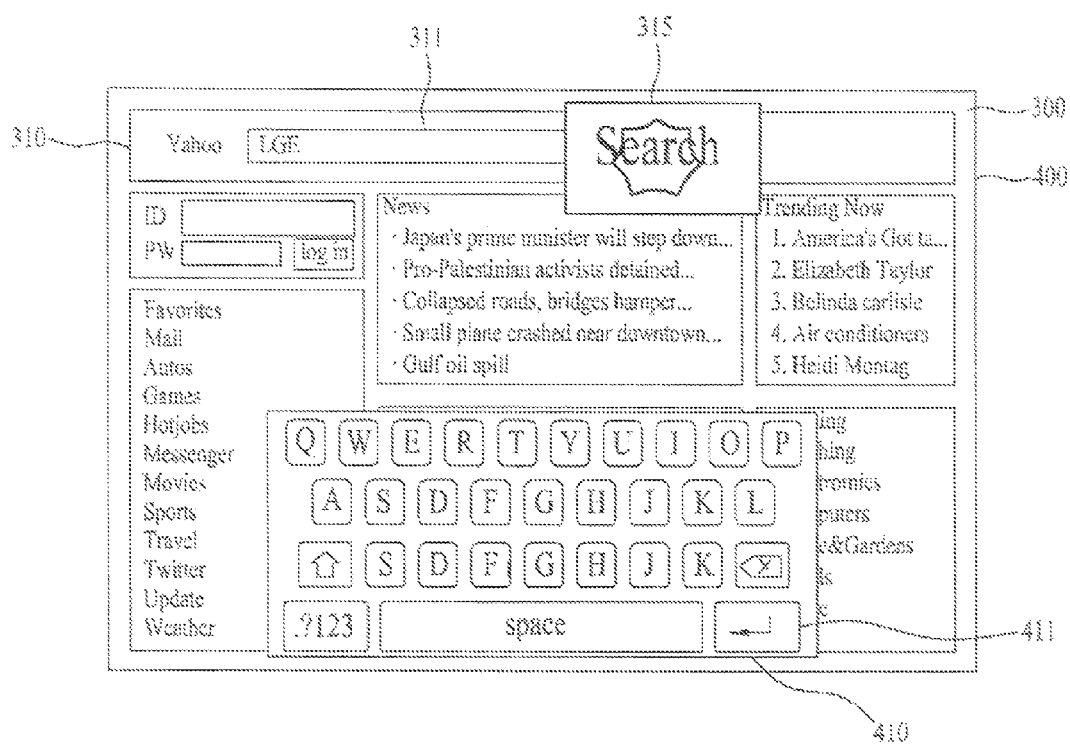

Accordingly, referring to FIG. 9C, the controller 180 controls display of the search word icon 315 to be zoomed in (or enlarged). If the search word icon 315 is touched or selected, the controller 180 may transmit a command for requesting a search of the search word to a corresponding server of the specific webpage.

Figure 10A:
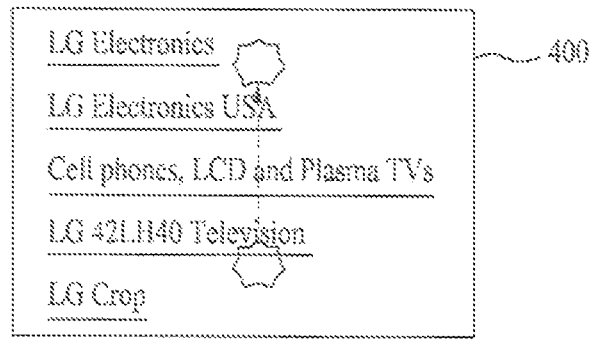

Further embodiments are now described with reference to FIGS. 10A, 10B and 10C. Referring to FIG. 10A, the controller 180 receives a webpage providing a search result from the corresponding server and controls the display to display the received webpage. If the search result webpage is not fully displayed on the entire screen of the touchscreen 400, a "touch & drag" function may be performed on the touchscreen 400 in order to scroll the display of the search result webpage (e.g., in order to view a bottom portion of the search result webpage).

Figure 10B:
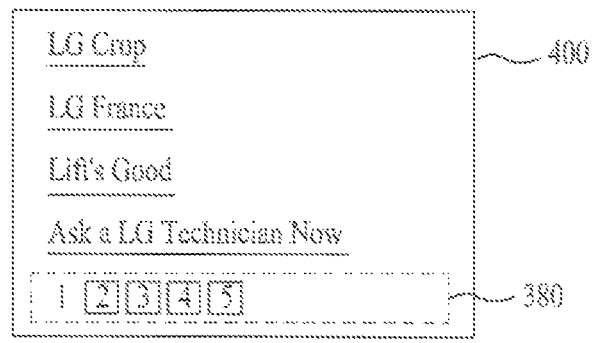

Generally, as illustrated in FIG. 10B, search webpage icons 380 of the search result, are displayed on the bottom portion of the search result webpage. According to one embodiment, when the bottom portion of the search result webpage is displayed, the controller 180 may predict a use command that is to be input after the touch & drag use command (or function) is performed.

The prediction may be based on the analyzed usage pattern. For instance, after the touch & drag use command is performed, the controller 180 may predict that a selection of the search webpage icons 380 is a strongest candidate for the next use command to be input, based according to the usage pattern.

Figure 10C:
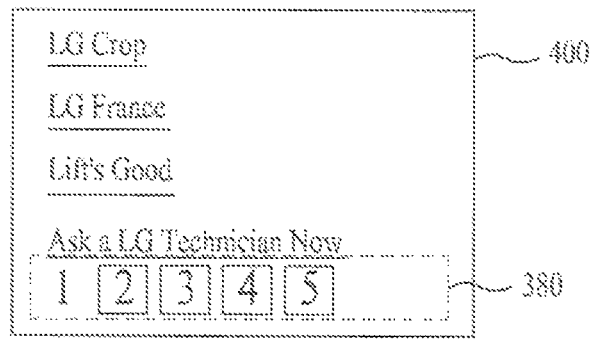

Accordingly, referring to FIG. 10C, the controller 180 controls display of the search webpage icons 380 to be zoomed in (or enlarged). The user is then able to touch and select one of the zoomed-in search webpage icons 380.

Other embodiments are now described with reference to FIGS. 11A, 11B and 11C. FIGS. 11B and 11C are diagrams illustrating screen configurations of a display screen of a mobile terminal 100 in which a method of controlling the mobile terminal according to an embodiment of the present invention is implemented.

Referring to FIG. 11A, a specific webpage 300 is fully illustrated. The specific webpage 300 includes a current display area A1 that may be currently displayed on the touchscreen 100 (see, e.g., FIG. 11B). The specific webpage 300 also includes a preferred section area A2 including at least one portion of a section that is preferred by a user of the mobile terminal 100.

According to one embodiment, the preferred section area A2 includes an area including at least one portion of a section (e.g., a shopping section 370) that is most preferred by the user (e.g., the user most prefers to see this portion initially upon access of the specific webpage). Alternatively, the preferred section area A2 may correspond to an area including at least one portion of a most preferred section 370 that the user most prefers to see upon completion of an input of a certain use command to the specific webpage. In this situation, the area including the at least one portion of the preferred section may be set to include a title (e.g., 'shopping') of the preferred section 370.

Referring to FIG. 11B, the current display area A1 of the specific webpage 300 is displayed on the touchscreen 400. The controller 180 may control the display to display a direction indicator 421 on the touchscreen 400. The direction indicator 421 indicates a direction for scrolling the specific webpage in order to view the preferred section area A2 on the touchscreen 400. According to a further embodiment, the direction indicator 421 may be displayed together with information (e.g., a title such as "Shopping") regarding the preferred section 370.

In order to scroll the specific page, the user may perform a touch & drag action on the touchscreen 400 in a direction indicated by the direction indicator 421. Alternatively, a scroll bar provided on the touchscreen 400 may be manipulated. Alternatively, a touch of the direction indicator 421 may lead to scrolling the specific webpage 300 in order to display the preferred section area A2

The user may scroll the specific webpage displayed on the touchscreen 400 in a certain direction different from the scroll direction (i.e., the direction indicated by the direction indicator 421). In this situation, as the current display area A1 displayed on the touchscreen 400 is changed according to the scrolling of the specific webpage in the certain direction, the controller 180 may change the scroll direction indicated by the direction indicator 421 in order to face (or point to) the preferred section area A2.

Referring to FIG. 11C, if the specific webpage is scrolled along the direction indicated by the direction indicator 421, the preferred section area A2 may be displayed on the touchscreen 400. According to one embodiment, when at least one portion of the preferred section 370 is displayed on the touchscreen 400 or the title 'shopping' of the preferred section 370 is displayed on the touchscreen 400, the controller 180 may control display of the direction indicator 421 to be terminated.

The controller 180 may control a size of the direction indicator 421 to be changed in proportion to a spaced distance (or spatial separation) between the current display area A1 and the preferred section area A2. For instance, if the spaced distance between the current display area A1 and the preferred section area A2 is relatively large, the controller 180 may increase the size of the direction indicator 421 (e.g., with respect to a nominal size). As another example, if the spaced distance between the current display area A1 and the preferred section area A2 is relatively small, the controller 180 may decrease the size of the direction indicator 421 (e.g., with respect to a nominal size). With continued reference to FIG. 11C, when the preferred section area A2 is displayed on the touchscreen 400, the controller 180 may control a display of the most frequently used object (e.g., link 371) in the preferred section 370 to be zoomed in (or enlarged) according to the usage pattern.

Other embodiments are now described with reference to FIGS. 12A and 12B. FIG. 12B are diagrams illustrating a screen configuration of a display screen of a mobile terminal 100 in which a method of controlling a mobile terminal according to an embodiment of the present invention is implemented.

Figure 12A:
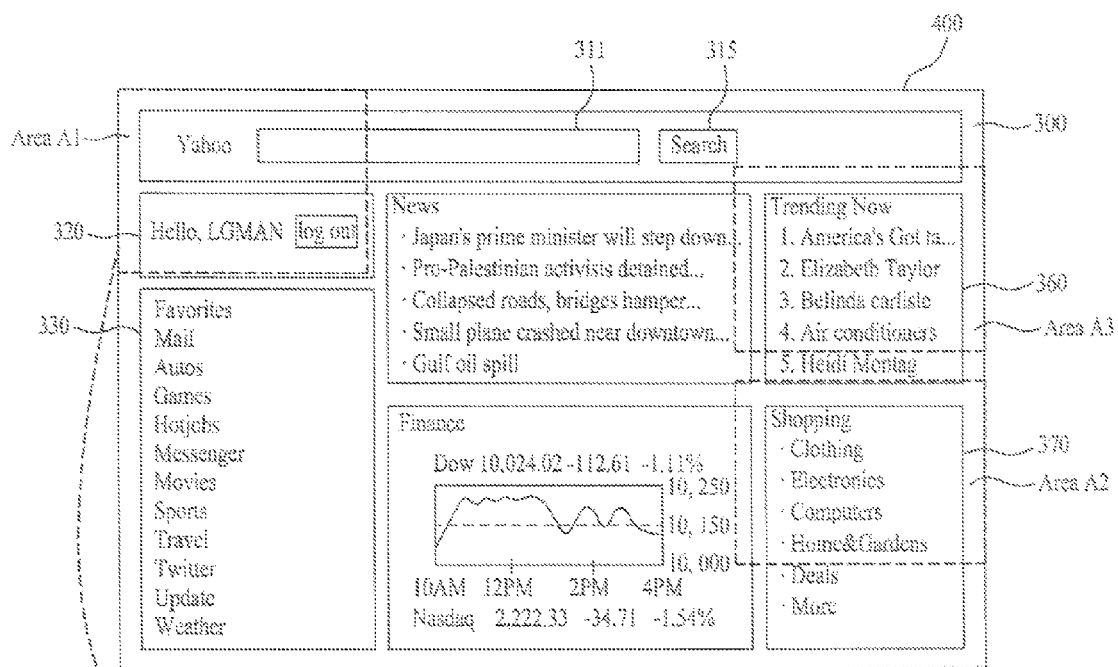
FIGS. 12A and 12B are diagrams illustrating a screen configuration of a display screen of a mobile terminal in which a method of controlling a mobile terminal according to an embodiment of the present invention is implemented.
Figure 12B:
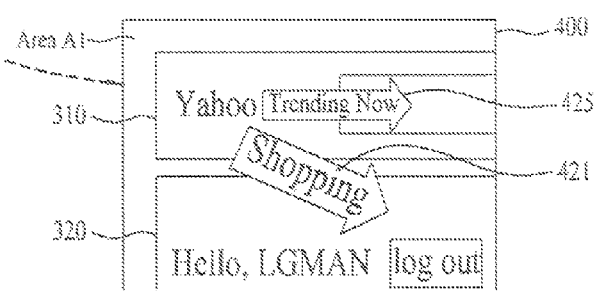

Referring to FIG. 12A, a specific webpage 300 is fully illustrated. The specific webpage 300 includes a current display area A1 that may be currently displayed on the touchscreen 400 (see, e.g., FIG. 12B). The specific webpage 300 also includes a most preferred section area A2 including at least one portion of a section preferred by the user according to a highest priority. The specific webpage 300 also includes a second most preferred section area A3 including at least one portion of a section 360 preferred by the user according to a second highest priority.

Referring to FIG. 12B, the current display area A1 of the specific webpage is displayed on the touchscreen 400. The controller 180 may control the display to display a first direction indicator 421 and a second direction indicator 425 on the touchscreen 400. The direction indicator 421 indicates a direction for scrolling the specific webpage in order to view the most preferred section area A2 on the touchscreen 400. The second direction indicator 425 indicates a direction for scrolling the specific webpage in order to view the second most preferred section area A3 on the touchscreen 400.

According to a particular embodiment, the first direction indicator 421 and the second direction indicator 425 may be displayed in a manner such that they are visually distinguishable from each other. Referring to FIG. 12B, the first and second direction indicators 421 and 425 are displayed in a manner such that a size of the first direction indicator 421 is larger than the size of the second direction indicator 425. Further, text included in the first direction indicator 421 may be of a larger font than the text included in the second direction indicator 425.

As mentioned earlier (e.g., with reference to FIG. 11C), when the specific webpage 300 is scrolled along a direction indicated by the first direction indicator 421, the preferred section area A2 may be displayed on the touchscreen 400. Similarly, in the embodiment of FIG. 12B, when the specific webpage is scrolled along a direction indicated by the first direction indicator 421 (or the second direction indicator 425), the most preferred section area A2 (or the second most preferred section area A3) may be displayed on the touchscreen 400. When either the most preferred section or the second most preferred section is displayed on the touchscreen, the controller 180 may cause display of the indicator corresponding to the displayed section to be terminated.

Figure 13A:
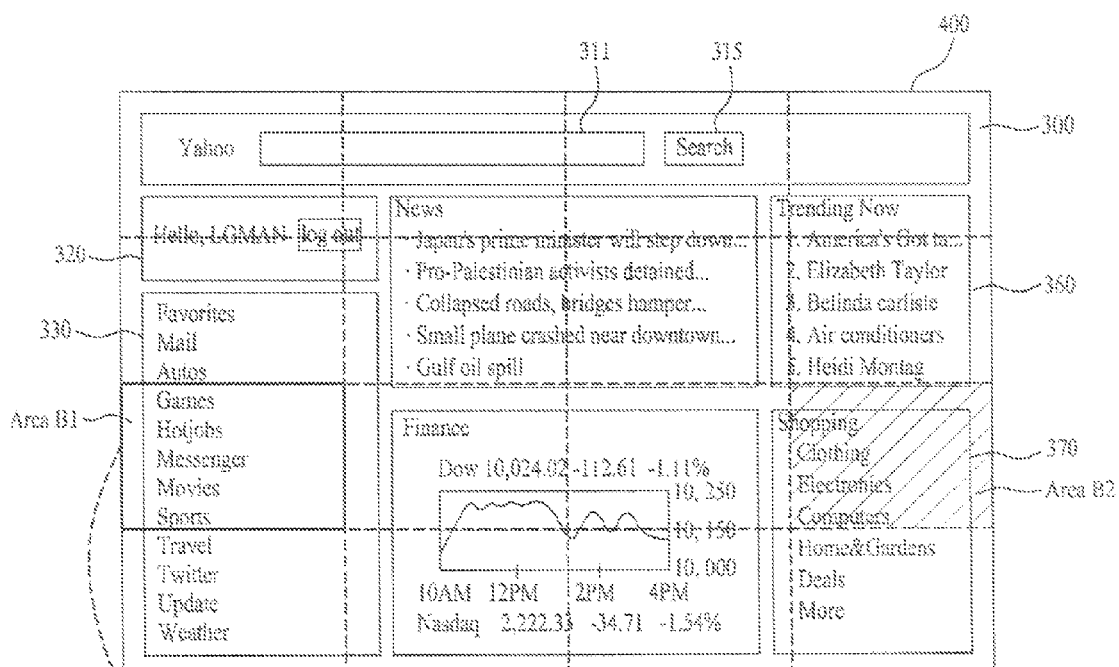
FIGS. 13A and 13B are diagrams illustrating screen configurations of a display screen of a mobile terminal in which a method of controlling a mobile terminal according to an embodiment of the present invention is implemented.
Figure 13B:
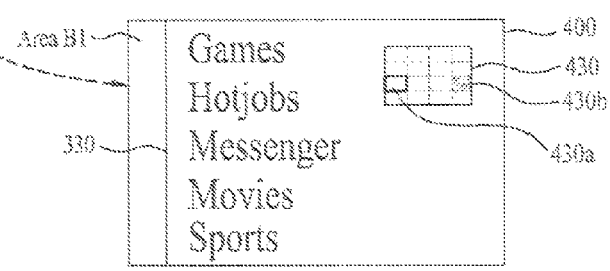

Other embodiments are now described with reference to FIGS. 13A and 13B. FIGS. 13A and 13B are diagrams illustrating screen configurations of a display screen of a mobile terminal 100 in which a method of controlling a mobile terminal according to an embodiment of the present invention is implemented.

Referring to FIG. 13A, a specific webpage 300 is fully illustrated. The specific webpage 300 is displayed such that partitions of a grid are shown. The partitions may be spaced apart from each other by a predetermined interval(s).

It is appreciated that the grid need not be displayed on the specific webpage 300. For example, the grid may be virtually displayed on the specific webpage 300. The specific webpage 300 includes a current display area B1 that is displayed on the touchscreen 400 (see, e.g., FIG. 13B) and a preferred section area B2 including at least one portion of a section 370 preferred by a user of the mobile terminal.

Referring to FIG. 13B, the current display area B1 of the specific webpage 300 is displayed on the touchscreen 400. The controller 180 may control the display such that a grid 430 representing a whole image of the specific webpage 300 is also displayed on the touchscreen 400.

In the grid 430, an indicator 430a indicating (or corresponding to) the current display area B1 and an indicator 430b indicating (or corresponding to) the preferred section area B2 may be displayed such that the indicators 430a, 430b are visually distinguishable from each other. Therefore, by viewing the indicators on the grid 430, the user of the mobile terminal user is made aware of a direction in which the specific webpage 300 is scrolled in order to view the preferred section area B2 on the touchscreen 400.

FIG. 13B illustrates that the indicators 430a, 430b that are displayed in the grid 430 displayed on the touchscreen 400 correspond to the partitions illustrated in FIG. 13A. It is appreciated that that the partitions need not be spaced apart from each other by a predetermined interval. Hence, the indicators 430a, 430b of the grid 430 need not conform exactly with the predetermined interval. That is, the area indicator may be displayed to cover at least two cells of the grid.

Accordingly, embodiments of the present invention provide the following effects and/or features. According to at least some embodiments of the present invention, even if a webpage displayed on a mobile terminal contains a large amount of contents, display of a preferred section of the specific webpage that is zoomed in (or enlarged) is directly presented when a specific webpage is opened initially, or a scroll direction for viewing the preferred section may be displayed. Therefore, even if a size of a display screen is small, the specific webpage can be more conveniently viewed.

According to at least some embodiments of the present invention, a next user command is predicted according to a usage pattern of the specific webpage in the mobile terminal, and display of an object or section of the specific webpage for receiving an input of the predicted user command is zoomed in (or enlarged). Therefore, interaction with the specific webpage can be more conveniently performed.

It will be appreciated by those skilled in the art that various modifications and variations can be made without departing from the spirit or scope of the described embodiments. Thus, it is intended that the present invention covers such modifications and variations, including modifications and variations that come within the scope of the appended claims and their equivalents.

For instance, the above-described embodiments can be implemented in a programmable recorded medium as computer-readable codes. The computer-readable media may include recording devices in which data readable by a computer system are stored. The computer-readable media may include ROM, RAM, CD-ROM, magnetic tapes, floppy discs, and optical data storage devices, for example, and may also include carrier-wave type implementations (e.g., transmission via the Internet). The computer may include the controller 180 of the terminal.

What is claimed is:

1. A mobile terminal comprising:
a display unit configured to display a webpage having a plurality of sections;
a wireless communication unit configured to provide Internet access;
a memory unit configured to store history information regarding usage of the webpage; and
a control unit configured to control a display of a region substantially including a preferred section of the plurality of sections of the webpage upon an access of the webpage,
wherein the region substantially including the preferred section is enlarged relative to a display of other sections of the plurality of sections by the display unit,
wherein the display of the preferred section is based on the stored history information,
wherein the control unit is further configured to control a display of at least one object enlarged, when a bottom portion of the webpage is displayed in response to user command,
wherein the at least one object is predicted to be selected based on the stored history information, when the user command is received, and
wherein the control unit is further configured to control the display unit to display a currently displayed section of the plurality of sections and a direction indicator indicating a direction for scrolling the webpage to view the preferred section.

2. The mobile terminal of claim 1, wherein the control unit is further configured to control the stored history information to be updated during the access of the webpage.

3. The mobile terminal of claim 2, wherein the control unit is further configured to cumulatively record usage of each of the plurality of sections during the access of the webpage and to recognize a section of the plurality of sections used most frequently as the preferred section.

4. The mobile terminal of claim 3, wherein the preferred section includes an initially used section of the plurality of sections that is cumulatively used most frequently each time the webpage is accessed.

5. The mobile terminal of claim 1, wherein the control unit is further configured to:
determine a usage pattern based on the stored history information; and
predict a next user command to be input by a user based on the determined usage pattern upon input of a user command in the specific webpage.

6. The mobile terminal of claim 5, wherein the control unit is further configured to control a display of an object corresponding to the predicted next user command to be visually distinguishable from other displayed objects in order to facilitate an input of the predicted next user command.

7. The mobile terminal of claim 6, wherein the control unit is further configured to enlarge the display of the object corresponding to the predicted next user command relative to the other displayed objects.

8. The mobile terminal of claim 1, wherein the control unit is further configured to control the display unit to display an indicator indicating a scroll direction for scrolling the webpage to view the preferred section if the preferred section is not viewably displayed by the display unit.

9. The mobile terminal of claim 8, wherein the control unit is further configured to terminate the display of the indicator upon scrolling of the webpage such that the preferred section is displayed on the display unit.

10. The mobile terminal of claim 1, wherein the control unit is further configured to:
    determine a usage pattern based on the stored history information; and
    predict a first most preferred section and a second most preferred section of the plurality of sections according to the determined usage pattern.

11. The mobile terminal of claim 10, wherein the control unit is further configured to control the display unit to display a first indicator indicating a scroll direction for scrolling the webpage to view the first most preferred section and a second indicator indicating a scroll direction for scrolling the webpage to view the second most preferred section when the first most preferred section and the second most preferred section are not viewably displayed by the display unit.

12. The mobile terminal of claim 11, wherein the control unit is further configured to control the display unit to display the first indicator and the second indicator such that the first indicator and the second indicator are visually distinguishable from each other.

13. The mobile terminal of claim 11, wherein the control unit is further configured to terminate the display of the first indicator or the second indicator when the first most preferred section or the second most preferred section is displayed by the display unit.

14. A method of controlling a mobile terminal, the method comprising:
    storing history information regarding usage of a webpage having a plurality of sections;
    accessing the webpage via the Internet;
    displaying a region substantially including a preferred section of the plurality of sections of the webpage upon the access of the webpage;
    displaying at least one object enlarged, when a bottom portion of the webpage is displayed in response to user command; and
    displaying a currently displayed section of the plurality of sections and a direction indicator indicating a direction for scrolling the webpage to view the preferred section,
    wherein the region substantially including the preferred section is enlarged relative to a display of other sections of the plurality of sections by the display unit,
    wherein displaying the preferred section is based on the stored history information, and
    wherein the at least one object is predicted to be selected based on the stored history information, when the user command is received.

15. The method of claim 14, further comprising:
    determining a usage pattern based on the stored history information; and
    predicting a next user command to be input by a user based on the determined usage pattern.

\* \* \* \* \*